3,156,670
HEAT-HARDENABLE PHENOLIC RESINS
Anthony C. Soldatos, Highland Park, N.J., assignor to Union Carbide Corporation, a corporation of New York
No Drawing. Filed Aug. 31, 1960, Ser. No. 53,064
10 Claims. (Cl. 260—58)

This invention relates to improved heat-hardenable phenolic resins. More specifically, this invention relates to flexible, heat-hardenable water-insoluble liquid phenolic resins which have particular utility as protective coatings on various surfaces such as glass and metal.

Heretofore, the poor flexibility characteristics, poor impact resistance and poor color stability of phenolic resins has limited considerably the scope of usefulness of such resins in coating applications. For example, coatings of phenolic resins, which have been formed by applying an organic solution of the resin onto a surface and baking the coated surface until the organic solvent is driven off and the resin cures to a hard, infusible state, are brittle and very readily flake off the surface to which they have been applied. Furthermore, such coatings are extremely sensitive to impact, losing their adhesiveness upon being struck by a blow. In addition, these coatings discolor during the curing operation losing their original color characteristics.

The deficiencies of previously known phenolic resins has practically eliminated their use as protective coatings on metal blanks which, after being coated and the coating cured, are formed into shaped articles such as cans. Due to the poor flexibility characteristics and poor impact resistance of these resins, coatings formed therefrom flake off the metal during the shaping operation.

The present invention provides for heat-hardenable phenolic resins which, when applied as coatings onto smooth, hard, non-porous surfaces such as glass, tin, aluminum sheet, and steel and cured thereon to a hard, infusible state, yield strongly adherent films which possess excellent flexibility, excellent impact strength and excellent color stability and furthermore exhibit excellent resistivity to boiling water, to organic solvents, to caustics and to organic and inorganic acids.

The phenolic resins of the present invention are heat-hardenable, water-insoluble liquid condensation reaction products of a phenol, formaldehyde and a dihydric glycol having the general formula:

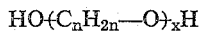

in which $n$ is an integer having a value of 2 to 10 inclusive, preferably 2 to 6 inclusive and $x$ is an integer having a value of 1 to 15 inclusive, preferably 1 to 3 inclusive, the resin containing less than about 2 percent by weight, preferably less than about 1.5 percent by weight, based on the weight of the resin, of water-soluble organic resinification reaction by-products.

The phenolic resins can be conveniently produced by condensing a phenol, formaldehyde and a glycol, having the formula previously noted, wherein the reactants are present in the following ratios; from about 1.5 to about 3 moles of formaldehyde per mole of phenol and from about 0.3 to about 1.5 moles of dihydric glycol per mole of phenol and purifying the resin obtained, generally by water washing, so that the resin contains less than about 2 percent by weight, preferably less than about 1.5 percent by weight, based on the weight of the resin, of water-soluble organic resinification reaction by-products. If desired, more than about 3 moles of formaldehyde per mole of phenol and more than about 1.5 moles of dihydric glycol per mole of phenol can be used, but this is economically undesirable.

A particularly desirable phenolic resin from the standpoint of optimum physical and chemical properties is a phenolic resin having the degree of purity described in the preceding paragraph, produced by reacting a phenol, formaldehyde and a dihydric glycol in the following ratios; one mole of a phenol per 3 moles of formaldehyde per 0.8 mole of a dihydric glycol.

The phenolic resins, which after purification, yield the heat-hardenable, water-insoluble phenolic resins of the present invention, are generally prepared by condensing a phenol, formaldehyde and a dihydric glycol for a period of time ranging from about 1 to about 3 hours in the presence of an alkaline catalyst, exemplary of which are the alkali hydroxides such as sodium hydroxide, potassium hydroxide and the like; alkaline earth metal hydroxides such as calcium hydroxide and the like; alkaline earth metal oxides such as calcium oxide and the like; alkaline earth metal carbonates such as calcium carbonate and the like; ammonia; and quaternary ammonium compounds such as tetraethanol ammonium hydroxide and the like and then neutralizing the reaction mixture with mineral acids, organic acids, or salts of these acids.

As a convenient method of preparing the unpurified resin, a phenol, formaldehyde and a dihydric glycol, in amounts such that the mole ratio of formaldehyde to phenol is from about 1.5 to about 3 to 1 and the mole ratio of dihydric glycol to phenol is from about 0.3 to about 1.5 to 1, are placed in a reaction vessel and the pH of the mixture adjusted to between 8 and 12 by the addition thereto of an alkaline catalyst such as sodium hydroxide. The reaction mixture is then heated to a temperature of between about 70° C. and 80° C. and maintained at this temperature for about 3 hours. The reaction mixture is then adjusted to a pH of between 2 and 4 using an acid such as phosphoric acid and thereafter dehydrated under vacuum and at elevated temperatures to yield a heat-hardenable phenolic resin having a water-miscibility of less than about 15 percent.

As an alternative method, the dihydric glycol can first be reacted with formaldehyde by forming a mixture containing the dihydric glycol and formaldehyde, adjusting the pH of the mixture to between 8 and 13 by the addition thereto of an alkaline catalyst such as sodium hydroxide and heating the reaction mixture at a temperature of between about 50° C. and 70° C. for about 1½ hours. The phenol is then added and the reaction mixture heated an additional 3 hours at a temperature of between about 50° C. and 70° C. The reaction mixture is thereafter adjusted to a pH of between 2 and 4 and dehydrated under a vacuum and at elevated temperatures to yield a heat-hardenable phenolic resin having a water-miscibility of less than about 15 percent.

Water-miscibility referred to herein is determined by adding known increments of distilled water, which has been adjusted to a temperature of about 25° C., to a known volume of phenolic resin, which is at the same temperature as that of the distilled water, until the appearance of a turbidity which is not dissipated by thorough mixing. The maximum amount of distilled water which can be added before the appearance of a persistent turbidity, multiplied by 100 is the percent water-miscibility. For example, a phenolic resin that can be diluted in this manner with a maximum of 0.15 times its own volume of water is said to have a water-miscibility of 15 percent. For purposes of this invention, the water-miscibility of the unpurified reaction products of a phenol, formaldehyde and a dihydric glycol is less than about 15 percent.

The condensation reaction products of a phenol, formaldehyde and a dihydric glycol, which, when purified, yield the phenolic resins of this invention, form a resin in which phenolic nuclei are linked, one to another, by dihydric glycol residues through aliphatic ether linkages.

In order to conclusively prove that the dihydric glycol is chemically combined in the phenolic resin and acts as a link in connecting phenolic nuclei through aliphatic ether linkages, the phenolic resin of Example 1 of this specification was subjected to infra-red analysis. Analysis of the resin showed strong absorption bands between 9.25 and 9.5 microns which is consistent with absorption bands obtained on infrared analysis of aliphatic ethers, as for example, diethylether.

That the "alternative method" as explained, results in the preparation of a phenolic resin in which the dihydric glycol is chemically combined in the resin in a manner described in the preceding paragraph is proved by the following: a reaction mixture was prepared by admixing 2185 grams (27 moles) of a 37 percent aqueous solution of formaldehyde with 5586 grams (9 moles) of ethylene glycol. To this mixture was then added an aqueous solution of sodium hydroxide whereby the pH of the reaction mixture was adjusted to 11. The reaction mixture was heated for 1½ hours at a temperature of between 60° C. and 70° C. and to the mixture was then added 9 moles of phenol. The reaction mixture was then heated an additional 3 hours at a temperature of between 60° C. and 70° C. Thereafter the reaction mixture was neutralized to a pH of 2.78 and vacuum distilled under 29 inches (Hg) of vacuum to a temperature of 90° C., yielding a phenolic resin which had a water-miscibility of less than 15 percent. This resin showed a strong absorption band between 9.25 and 9.5 microns.

The presence of aliphatic ether linkages in the resins of the present invention is further demonstrated by the fact that a phenolic resin prepared as described in Example 1 of this specification with the exception that no glycol was used, did not absorb at between 9.25 and 9.5 microns when subjected to the infra-red test.

The purification of the phenolic resins can be accomplished by any one of a number of convenient methods. It is generally convenient to dissolve the phenolic resin in water-immiscible solvents such as ketones, illustrative of which are methyl-n-propyl ketone, methyl isobutyl ketone, methyl n-amyl ketone and the like; alcohols such as 2-ethyl-n-butanol, n-butanol, 1-pentanol; 2-methyl-1-pentanol, 1-hexanol and the like and to water-wash the organic solution until the resin contains less than about 2 percent by weight, based on the weight of the resin, of water-soluble organic resinification reaction by-products. For purposes of this invention a resin is considered to be free of water-soluble organic resinification reaction by-products when it contains on measurable amount of such products. This determination is accomplished by evaporating each aqueous wash liquid. When the aqueous wash liquid can be evaporated to dryness at a temperature of 100° C., i.e., no residue remains, it is considered that the resin has been washed free of water-soluble organic resinification reaction by-products. As a practical matter at least 3 washings using at least 1000 ml. portions of water are necessary to achieve this desired result.

Among phenols suitable for reaction with formaldehyde and a dihydric glycol are the trifunctional phenols, that is phenols having at least 3 unsubstituted positions, illustrative of which are the following: phenol; meta-substituted phenols such as the alkylated phenols exemplary of which are m-cresol, m-ethyl phenol, m-n-propyl phenol, m-isopropyl phenol, m-n-butyl phenol, m-sec.-butyl phenol, m-tert. butyl phenol, m-allyl phenol, m-amyl phenol and the like as well as the commercially available m-cresol which contains small amounts of both the para and the ortho isomers; meta-substituted alkoxy phenols such as m-methoxy phenol, m-ethoxy phenol, m-propoxy phenol, m-amyloxy phenol and the like; the meta-halogenated phenols such as m-chloro phenol, m-bromo phenol and the like; also suitable is resorcinol.

Formaldehyde in any of its available forms, i.e., formalin and para formaldehyde can be used.

Specific glycols falling within the scope of the general formula:

$$HO(C_nH_{2n}-O)_xH$$

wherein $n$ and $x$ are as previously defined, are ethylene glycol, diethylene glycol, trimethylene glycol, pentamethylene glycol, decamethylene glycol, propylene glycol, triethylene glycol, dipropylene glycol and the like as well as mixtures thereof. Also suitable are the commercially available glycols, falling within the purview of the general formula noted, marketed under the trade name "Carbowax" by Union Carbide Corporation such as the liquid "Carbowaxes" illustrative of which are "Carbowax 400" which has an average molecular weight of about 400 and "Carbowax 600" which has an average molecular weight of about 600.

In order to further indicate the excellent physical and chemical properties of the phenolic resins of this invention, steel panels, 3 inches wide and 5 inches long were coated with these resins, the coated panels heated until the coatings were cured and the coated panels subjected to tests which are described below. The exact formulation of the resin used in each instance is indicated in the examples of this specification, the examples being illustrative of the present invention.

*Flexibility Test.*—Coated panels, with their coated side up, were bent 180° over a ⅛ inch diameter steel mandrel while in an atmosphere having a temperature of 77° C. and a relative humidity of 50 percent. The coatings were rated (P) for passing and (F) for failing. A coating which did not crack or lose adhesion to the surface of the steel panel was rated as passing. A coating which broke, or cracked or lost adhesion was rated as failing.

*Impact Test.*—Coated panels were struck on their coated side with impacts as noted in the examples of this specification using a 160 inch-pound Gardner Variable Impact Tester. The coatings were rated as described for the Flexibility Test.

*Solvent Resistance.*—Coated panels were immersed in either acetone or toluene which were at a temperature of about 25° C., for periods of time as indicated in the examples of this specification. The coatings were rated as described for the Flexibility Test.

*Caustic Resistance.*—Coated panels were immersed in a 50 percent by weight aqueous solution of sodium hydroxide, which was at a temperature of about 25° C., for periods of time as indicated in the examples of this specification. The coatings were rated as described for the Flexibility Test.

*Boiling Water Resistance.*—Coated panels were immersed in boiling water for a period of time as indicated in the examples of this specification. The coatings were rated as described for the Flexibility Test.

*Acid Resistance.*—Coated panels were immersed either in a 50 percent by volume aqueous solution of acetic acid or a 50 percent by volume aqueous solution of sulfuric acid, both solutions being at a temperature of about 25° C., for periods of time as indicated in the examples of this specification. The coatings were rated as described for the Flexibility Test.

EXAMPLE 1

Into a three-necked flask, equipped with a condenser, thermometer and stirrer, there was placed 847 grams (9 moles) of phenol, 2185 grams (27 moles) of a 37 percent by weight aqueous solution of formaldehyde, and 1206 grams (9 moles) of dipropylene glycol. The pH of the mixture was adjusted to between 9.0 and 10.5 by the addition thereto of 80 grams (0.5 mole) of a 25 percent by weight aqueous solution of sodium hydroxide. The mixture was then heated to 70° C. and maintained at 70° C. for three hours while being continuously stirred. The reaction mixture was then cooled to a temperature of between 50° C. and 60° C. and its pH adjusted to 3.5 by the addition thereto of an aqueous solution prepared by admixing 92 grams of water with 92 grams of an 87 percent by weight aqueous solution of phosphoric acid. The contents of the flask were then subjected to a vacuum of 28 inches (Hg) at a temperature of between 100° C. and 110° C. An organic solution of the phenolic resin, which remained in the flask, was formed by pouring 1000 grams of methyl isobutyl ketone into the flask. The solution was washed with 3 portions of water, each portion being of 1000 ml., by pouring each portion into the flask, swirling the contents of the flask, and then decanting the water. The liquid phenolic resin was recovered by subjecting the methyl isobutyl ketone solution to vacuum distillation under 28 inches (Hg) of vacuum at a temperature of between 100° C. and 110° C.

The purified, heat-hardenable water-insoluble, liquid resin obtained, containing no measurable amount of water soluble products was then dissolved in sufficient methyl isobutyl ketone to provide a solution of 60 percent by weight on a solids basis. The solution was then used to coat a steel panel using a draw-down blade having a gap clearance so as to provide a coating of the desired thickness on the panel. The coated panel was placed in a circulating air oven and the coating thereon cured.

A number of heat-hardenable, water-insoluble liquid phenolic resins containing no measurable amount of water-soluble products were also prepared as described in this example using the same mole ratio of reactants and using the same procedure with the exceptions however, that different glycols were used in each instance and the amount of phosphoric acid used in the preparation of each phenolic resin was such as to adjust the pH of the reaction mixture to the value noted in the table which follows. Each resin prepared was applied as a coating onto a steel panel and the coating cured as described.

All coated panels were subjected to tests in order to determine the chemical and physical properties of the phenolic resin coatings.

The table below identifies the glycol used to prepare each resin, the pH of the reaction mixture once phosphoric acid was added during the preparation of each resin, the curing cycle to which each coating was subjected, the thickness of each cured coating, tests undergone by each coating and the results of each test.

| Resin | pH | Glycol | Curing Cycle | Thickness in mils | Impact Test (160 inch-lbs. of impact) | Flexibility Test |
|---|---|---|---|---|---|---|
| 1 | 3.5 | Dipropylene glycol | 350° F. for 8 min | 0.4 to 0.5 | P | P. |
| 2 | 3.5 | Triethylene glycol | 350° F. for 30 min | 0.3 to 0.4 | P | P. |
| 3 | 2.4 | Ethylene glycol | 350° F. for 10 min | 0.59 | P | P. |
| 4 | 3.5 | Pentamethylene glycol | 350° F. for 30 min | 0.58 | P | P. |
| 5 | 2.83 | Poly(ethylene glycol) having the formula $HO\text{-}(C_2H_4\text{-}O)_9\text{-}H$ | 350° F. for 10 min | 0.43 | P | P. |

EXAMPLE 2

A number of heat-hardenable, water-insoluble, liquid phenolic resins containing no measurable amount of water-soluble products were prepared and purified using the same procedure as described in Example 1. The phenolic resins were then used to prepare coating solutions which were applied onto steel panels also as described in Example 1. The table which follows identifies the reactants used to prepare each resin, the curing cycle to which each coating was subjected, the thickness of each cured coating, tests undergone by each coating and the results of each test.

| Resin | Mole Ratio of Phenol to CH$_2$O to Dipropylene Glycol | Curing Cycle | Thickness in mils | Flexibility Test | Boiling Water Test [1] | Impact Test |
|---|---|---|---|---|---|---|
| 6 | 1 to 3 to 1 | 300° F. for 10 min | 0.34 | P | 4 hrs.—P | 160 inch-lbs.—P. |
| 7 | 1 to 3 to 1 | 300° F. for 50 min | 0.40 | P | 4 hrs.—P | 160 inch-lbs.—P. |
| 8 | 1 to 3 to 1 | 325° F. for 10 min | 0.36 | P | 5½ hrs.—P | 160 inch-lbs.—P. |
| 9 | 1 to 3 to 1 | 350° F. for 3 min | 0.46 | P | 3½ hrs.—P | 160 inch-lbs.—P. |
| 10 | 1 to 3 to 0.8 | 325° F. for 10 min | 0.51 | P | 2 hrs.—P | 160 inch-lbs.—P. |
| 11 | 1 to 3 to 0.5 | 325° F. for 25 min | 0.47 | P | 2 hrs.—P | 160 inch-lbs.—P. |
| 12 | 1 to 3 to 0.5 | 325° F. for 35 min | 0.43 | P | 4 hrs.—P | 90 inch-lbs.—P. |
| 13 | 1 to 2 to 1.5 | 300° F. for 15 min | 0.33 | P | | 120 inch-lbs.—P. |
| 14 | 1 to 2 to 1.5 | 350° F. for 5 min | 0.33 | P | | 100 inch-lbs.—P. |
| 15 | 1 to 2 to 1 | 325° F. for 10 min | 0.51 | P | 2 hrs.—P | 160 inch-lbs.—P. |
| 16 | 1 to 2 to 1 | 325° F. for 25 min | 0.51 | P | 2½ hrs.—P | 40 inch-lbs.—P. |
| 17 | 1 to 1.5 to 1.5 | 300° F. for 5 min | 0.42 | P | | 110 inch-lbs.—P. |
| 18 | 1 to 1.5 to 1.5 | 300° F. for 15 min | 0.23 | P | | 60 inch-lbs.—P. |
| 19 | 1 to 1.5 to 1.5 | 350° F. for 5 min | 0.24 | P | | 60 inch-lbs.—P. |
| 20 | 1 to 1.5 to 1 | 300° F. for 15 min | 0.54 | P | | 130 inch-lbs.—P. |
| 21 | 1 to 1.5 to 1 | 300° F. for 30 min | 0.51 | P | | 12 inch-lbs.—P. |

[1] Test discontinued after the time indicated.

EXAMPLE 3

Two liquid phenolic resins were prepared and applied as coatings onto steel panels as described in Example 1. The coatings were then subjected to tests which are identified in the table which follows subsequently. Results of each test are also noted in the table along with the curing cycle to which each coating was subjected and the thickness of each cured coating.

*Resin A.*—This resin was prepared and purified as described in Example 1 wherein in the preparation of the resin the mole ratio of phenol to formaldehyde to dipropylene glycol used was 1 to 3 to 1. Resin A contained no measurable amount of water-soluble by-products.

*Control 1.*—This resin was identical to Resin A with the exceptions that the water-soluble organic resinification by-products were not removed and the resin was filtered removing salts therefrom.

| Resin | Curing Cycle | Thickness in mils | Flexibility Test | Impact Test | Boiling Water Test [1] |
|---|---|---|---|---|---|
| Resin A | 350° F. for 5 min | 0.98 | P | 40 inch-lbs.—P | 1 hr.—P. |
| Control 1 | 350° F. for 5 min | 0.40 | F | 8 inch-lbs.—F | 15 min.—F. |

[1] Test discontinued after the time indicated.

The data shown in this example show that the resistivity of a purified resin of this invention to boiling water is greater than the resistivity of an otherwise identical resin containing water-soluble organic resinification by-products.

EXAMPLE 4

A number of liquid phenolic resins were prepared and applied as coatings onto steel panels as described in Example 1. The coatings were then subjected to tests which are identified in the table which follows subsequently. Results of each test are also noted in the table along with data concerning the curing cycle to which each coating was subjected and the thickness of each cured coating.

*Resin B.*—This resin was prepared and purified in a manner described in Example 1 wherein in the preparation of the resin the mole ratio of phenol to formaldehyde to dipropylene glycol used was 1 to 3 to 1. Resin B contained no measurable amount of water-soluble products.

*Resin C.*—This resin was identical to Resin B except that there was added to the resin 0.7 percent by weight, based on the weight of the resin, of sodium phosphate.

*Resin D.*—This resin was identical to Resin B except that there was added to the resin 7 percent by weight, based on the weight of the resin, of dipropylene glycol.

*Resin E.*—This resin was identical to Resin B except that there was added to the resin 0.5 percent by weight sodium phosphate and 7 percent by weight diethylene glycol, both weight percentages being based on the weight of the resin.

*Control 2.*—This resin was identical to Resin B with the exception that there was added to the resin 41 percent by weight, based on the weight of the resin, of water-soluble organic resinification reaction by-products. The organic by-products were obtained by combining all of the aqueous washings and evaporating the washings free of water. The oily liquid which remained was recovered and added, in the specified amount, to the resin which is identified as Control 2.

in the preparation of the resin the mole ratio of phenol to formaldehyde to dipropylene glycol was 1 to 3 to 0.5. Resin F contained no measurable amount of water-soluble products.

*Resin G.*—This resin was identical to Resin F with the exception that there was added to the resin 7 percent by weight, based on the weight of the resin, phenol.

*Resin H.*—This resin was identical to Resin F with the exception that there was added to the resin 7 percent by weight, based on the weight of the resin, paraformaldehyde.

*Resin I.*—This resin was identical to Resin F with the exception that there was added to the resin 0.7 percent by weight, based on the weight of resin, water-soluble organic resinification reaction by-products.

*Control 3.*—This resin was identical to Resin F with the exception that there was added to the resin 3 percent by weight, based on the weight of the resin, water-soluble organic resinification reaction by-products.

*Control 4.*—This resin was identical to Resin F with the exception that there was added to the resin 7 percent by weight, based on the weight of the resin, water-soluble organic resinification reaction by-products.

*Control 5.*—This resin was identical to Resin F with the exception that there was added to the resin 21 percent by weight, based on the weight of the resin, water-soluble organic resinification reaction by-products.

| Resin | Curing Cycle | Thickness in mils | Flexibility Test | Impact Test | Boiling Water Test [1] |
|---|---|---|---|---|---|
| Resin F | 350° F. for 5 min | 0.89 | P | 60-inch-lbs.—P | 1 hr.—P. |
| Resin G | 350° F. for 5 min | 0.70 | P | 40-inch-lbs.—P | 1½ hrs.—P. |
| Resin H | 350° F. for 5 min | 0.97 | P | 60-inch-lbs.—P | 1½ hrs.—P. |
| Resin I | 350° F. for 5 min | 0.70 | P | 50-inch-lbs.—P | 1 hr.—P. |
| Control 3 | 350° F. for 5 min | 0.70 | F | 8-inch-lbs.—F | 1 hr.—F. |
| Control 4 | 350° F. for 5 min | 0.61 | F | 4-inch-lbs.—F | 15 min.—F. |
| Control 5 | 350° F. for 5 min | 0.75 | F | 4-inch-lbs.—F | 15 min.—F. |

[1] Test discontinued after the time indicated.

The results noted in this example demonstrate that the presence of unreacted formaldehyde and unreacted phenol does not adversely affect the properties of the resin but that the presence in the resin of water-soluble organic resinification reaction by-products does.

EXAMPLE 6

A phenolic resin, hereinafter referred to as Resin J was prepared using the same procedure and the same reactants as described in Example 1 with the exception that the mole ratio of reactants of phenol to formaldehyde to

| Resin | Curing Cycle | Thickness in mils | Flexibility Test | Impact Test | Boiling Water Test [1] |
|---|---|---|---|---|---|
| Resin B | 350° F. for 5 min | 0.98 | P | 40 inch-lbs.—P | 1 hr.—P. |
| Resin C | 350° F. for 5 min | 1.3 | P | 20 inch-lbs.—P | 1 hr.—P. |
| Resin D | 350° F. for 5 min | 1.2 | P | 50 inch-lbs.—P | 1 hr.—P. |
| Resin E | 350° F. for 5 min | 1.2 | P | 40 inch-lbs.—P | 1 hr.—P. |
| Control 2 | 350° F. for 5 min | 1.2 | F | 8 inch-lbs.—F | 15 min.—F. |

[1] Test discontinued after time indicated.

The results noted in this example demonstrate that the presence of salts and unreacted dihydric glycol does not adversely affect the properties of the resin but that the presence in the resin of water-soluble organic resinification reaction by-products does.

EXAMPLE 5

A number of liquid phenolic resins were prepared and applied as coatings onto steel panels as described in Example 1. The coatings were then subjected to tests which are identified in the table which follows subsequently. The results of each test are also noted in the table along with data concerning the curing cycle to which each coating was subjected and the thickness of each cured coating.

*Resin F.*—This resin was prepared and purified in a manner described in Example 1 with the exception that dipropylene glycol was as follows: 1 mole of phenol to 3 moles of formaldehyde to 0.8 mole of dipropylene glycol. Resin J was purified in a manner identical to that described in Example 1 and contained no measurable amount of water-soluble organic resinification reaction by-products.

A second phenolic resin was prepared, hereinafter referred to as Control 6 using the same procedure and the same reactants as described in Example 1 with the exception that no glycol was used.

Resin J and Control 6 were used to form coating solutions and these solutions used to coat steel panels in a manner as described in Example 1. Coating on each panel was cured by heating the coated panels at 325° F. for twenty minutes. Cured coatings were then subjected to tests to determine their properties. Tests and the results of the tests are noted in the table which follows:

| Test [1] | Resin J | Control 6 |
| --- | --- | --- |
| Caustic Resistance | 13 days—P | 13 days—F. |
| Sulfuric Acid Resistance. | 13 days—P | 13 days—F. |
| Color Stability Sunlight (ASTM-D620-57T). | No noticeable discoloration after 114 hrs. | Very noticeable discoloration after 114 hrs. |
| Accelerated Weathering (ASTM-D822-57T). | No noticeable discoloration. | Very noticeable discoloration. |
| Autoclaving | 2 hrs.—P | 2 hrs.—F. |
| Flexibility | P | F. |
| Impact | 160-inch-lbs.—P | 4-inch-lbs.—F. |

[1] Test discontinued after the time indicated.

The autoclave test was conducted by placing the coated panel in an autoclave under a pressure of 25 lbs. per square inch and at a temperature of 268° F.

The curing cycles to which the coating compositions, formed from the phenolic resins of this invention, are subjected, varies, as indicated in the examples of this specification, and depends upon the exact formulation of the composition being used. Generally the curing cycles are conducted at temperatures on the order of about 300° F. to about 350° F. until the composition cures to a hard, infusible state. Also, coating solutions prepared from the phenolic resins of the instant invention by dissolving the resin in appropriate solvents such as methyl ethyl ketone, methyl isobutyl ketone, acetone and the like usually contain from about 50 to about 60 per cent by weight resin, based on the combined weight resin and solvent. If desired, pigments such as titanium dioxide and other such modifiers can be added to the phenolic resins in suitable amounts as is well known in the art.

What is claimed is:

1. A heat-hardenable, water-insoluble, liquid phenolic resin, wherein phenolic nuclei are linked one to another by dihydric glycol residues through aliphatic ether linkages, which is the condensation reaction product, at elevated temperatures, of a mixture having a pH of from about 8 to about 12, which consists essentially of a trifunctional phenol, from about 1.5 to about 3 moles of formaldehyde, per mole of said phenol, and from about 0.3 to about 1.5 moles, per mole of said phenol, of a dihydric glycol having the general formula:

$$HO(C_nH_{2n}-O)_xH$$

wherein $n$ is an integer having a value of 2 to 10 inclusive and $x$ is an integer having a value of 1 to 15 inclusive, said phenolic resin purified so that it contains less than about 2 percent by weight, based on the weight of said resin, of water-soluble, organic resinification by-products.

2. A heat-hardenable, water-insoluble, liquid phenolic resin as described in claim 1 wherein in the formula of the dihydric glycol, $n$ is an integer having a value of 2 to 6 inclusive and $x$ is an integer having a value of 1 to 3 inclusive.

3. A heat-hardenable, water-insoluble liquid condensation reaction product as defined in claim 1 wherein the dihydric glycol is dipropylene glycol.

4. A heat-hardenable, water-insoluble liquid condensation reaction product as defined in claim 1 wherein the dihydric glycol is triethylene glycol.

5. A heat-hardenable, water-insoluble liquid condensation reaction product as defined in claim 1 wherein the dihydric glycol is ethylene glycol.

6. A heat-hardenable, water-insoluble liquid condensation reaction product as defined in claim 1 wherein the glycol is pentamethylene glycol.

7. A heat-hardenable, water-insoluble liquid condensation reaction product as defined in claim 1 wherein the glycol has the formula:

$$HO(C_2H_4-O)_9H$$

8. A heat-hardenable, water-insoluble liquid condensation reaction product as defined in claim 1 wherein the trifunctional phenol is selected from the group consisting of phenol, m-substituted alkyl phenol wherein the alkyl radical has a maximum of 3 carbon atoms, m-substituted alkoxy phenol wherein the alkoxy radical contains a maximum of 5 carbon atoms and m-substituted halogen phenol.

9. A heat-hardenable, water-insoluble, liquid phenolic resin, wherein phenolic nuclei are linked one to another by dihydric glycol residues through aliphatic ether linkages, which is the condensation reaction product, at elevated temperatures and at a pH of from about 8 to about 13, of a trifunctional phenol, from about 1.5 to about 3 moles of formaldehyde, per mole of said phenol, and from about 0.3 to about 1.5 moles, per mole of said phenol, of a dihydric glycol having the general formula:

$$HO(C_nH_{2n}-O)_xH$$

wherein $n$ is an integer having a value of 2 to 10 inclusive and $x$ is an integer having a value of 1 to 15 inclusive, said reaction product formed by reacting said formaldehyde with said glycol and thereafter reacting the resultant product with said phenol, said phenolic resin purified so that it contains less than about 2 percent by weight, based on the weight of said resin, of water-soluble, organic resinification by-products.

10. A heat-hardenable, water-insoluble, liquid phenolic resin as described in claim 9 wherein in the formula of the dihydric glycol, $n$ is an integer having a value of 2 to 6 inclusive and $x$ is an integer having a value of 1 to 3 inclusive.

References Cited in the file of this patent

UNITED STATES PATENTS

| | | |
| --- | --- | --- |
| 1,668,444 | Aiken | May 1, 1920 |
| 1,805,385 | Voss | May 12, 1931 |
| 1,952,243 | Frick | May 27, 1934 |
| 2,035,515 | Wilder | Mar. 31, 1936 |
| 2,169,991 | Rosenblum | Aug. 15, 1939 |
| 2,513,274 | Barkhuff | July 4, 1950 |
| 3,010,919 | Mackinney | Nov. 28, 1961 |